April 21, 1953  R. T. BUCY ET AL  2,635,476
SEMIAUTOMATIC TRANSMISSION

Filed March 22, 1948  7 Sheets-Sheet 5

INVENTORS.
Roy T. Bucy.
Augustin J. Syrovy.
BY William T. Dunn.
Harness & Harris
ATTORNEYS.

INVENTORS.
Roy T. Bucy.
Augustin J. Syrovy.
BY William T. Dunn.
Harness & Harris
ATTORNEYS.

Patented Apr. 21, 1953

2,635,476

UNITED STATES PATENT OFFICE 2,635,476

SEMIAUTOMATIC TRANSMISSION

Roy T. Bucy, Augustin J. Syrovy, and William T. Dunn, Detroit, Mich., assignors to Chrysler Corporation, Highland Park, Mich., a corporation of Delaware Application March 22, 1948, Serial No. 16,214

26 Claims. (Cl. 74—336)

This invention relates to power transmissions, particularly to fluid power driven semi-automatic transmissions providing a centrifugal type pawl clutch in combination with an overrunning clutch such that automatic changes in speed ratio drive between a manually conditioned relatively slow starting speed ratio drive and a relatively fast speed ratio drive may be readily accomplished without releasing the master clutch of the vehicle. A vehicle drive and transmission of this character is disclosed in the copending application of Robert W. Wolfe, Serial No. 780,011.

An object of the present invention is to provide improvements in transmissions of the foregoing character.

Another object is to provide means for obtaining a synchronized shift between neutral and freewheel second ratio drive on starting the vehicle from rest with a high idle engine to avoid tooth clash in such a shift.

A further object is to provide means for preventing establishment of a freewheel slow speed starting drive until the rotative speed of the driving and driven parts of the freewheel device are such that engagement of such device may take place without undue loading thereof.

A specific object is to provide a plural synchronizing means having a single resilient energizing element.

Another specific object is to provide a centrifugal pawl clutch comprising a centrifugal acting pawl and a plural windowed shell for engaging said pawl wherein the angular spacing between the windows is such as to prevent a "clunk" when effecting engagement following a change in relative direction of rotation between pawl and shell from an asynchronous condition.

An additional object is to provide means for controlling the shell of the centrifugal clutch and freewheel clutch to avoid tooth clash in shifts from two-way second to obtain direct drive.

These and other objects of our invention will become more apparent from the following description when taken in conjunction with the accompanying drawings wherein:

Fig. 6 is a detailed enlarged view of the mechanism of Fig. 4, the manually shiftable clutch sleeve being shown in neutral position and the pawls of the centrifugal clutch being shown disengaged;

Figures 1, 2, 3:
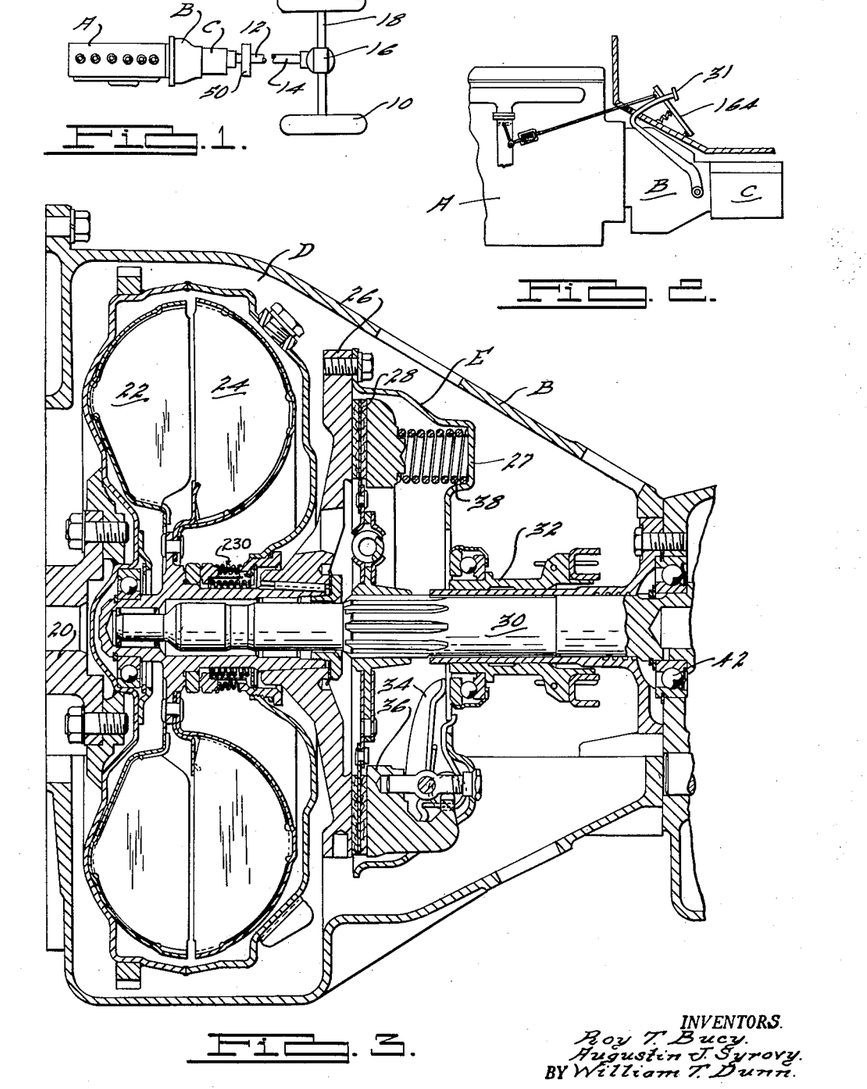
Fig. 1 is a diagrammatic showing of the power plant and drive mechanism of a vehicle incorporating the present invention.
Fig. 2 is a side elevational view of the power plant and transmission.
Fig. 3 is an enlarged cross-sectional view of a portion of the mechanism of Fig. 1.
Figure 3:
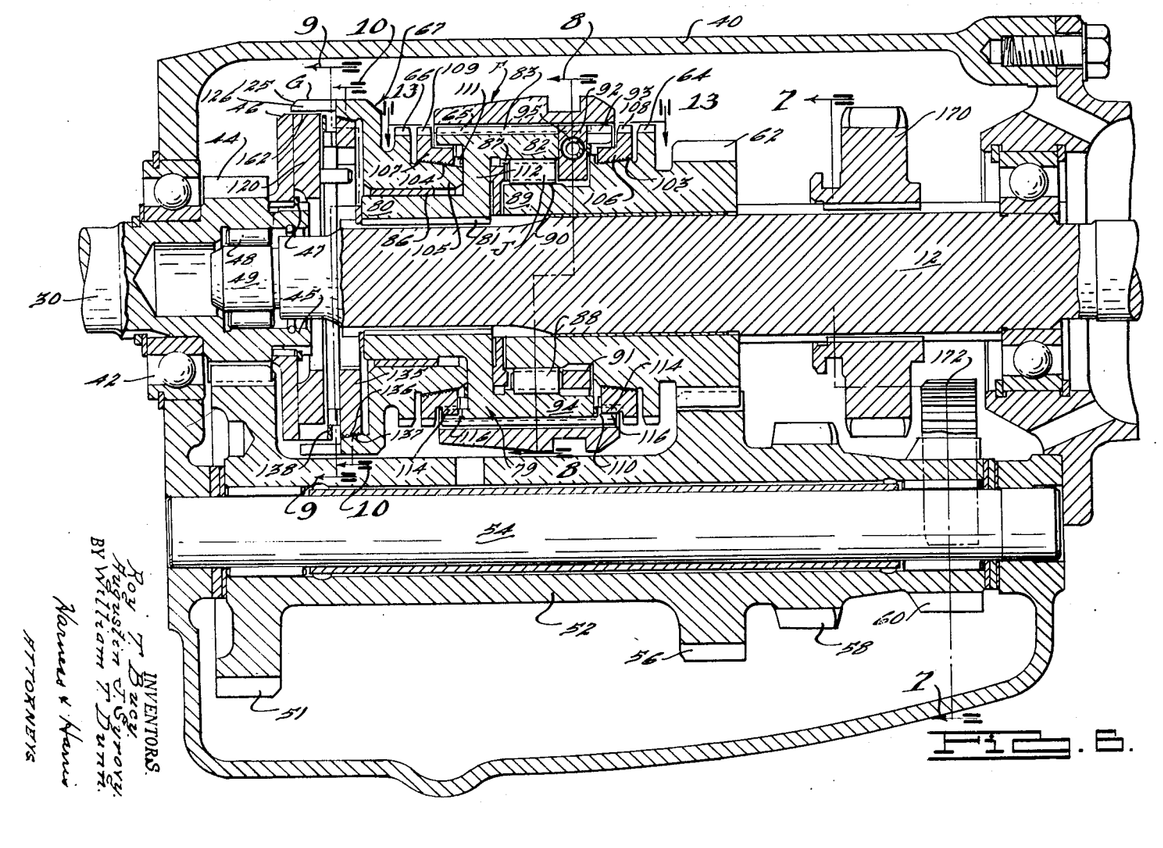
Figure 4:
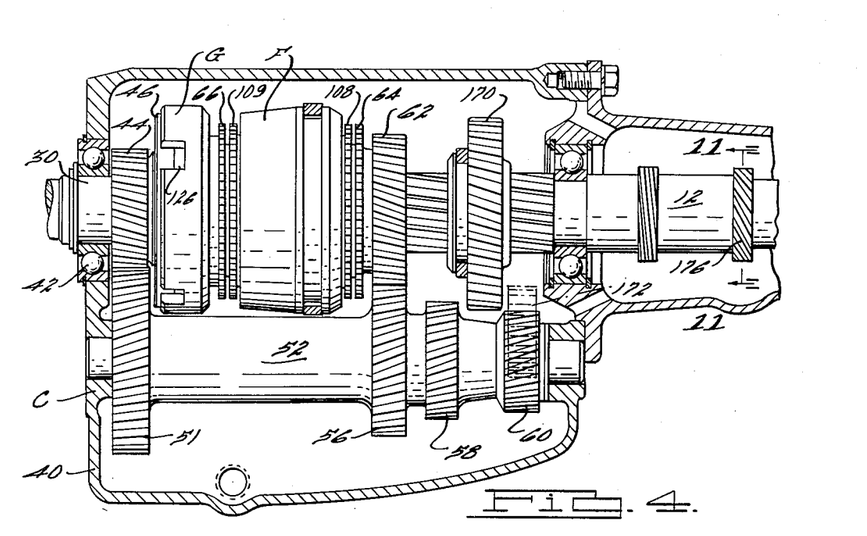
Fig. 4 is an elevational view partly in section of the change speed transmission of our invention and which drivingly connects with the mechanism of Fig. 3.

Referring now to the drawings wherein similar reference characters are used to designate corresponding parts of the structure, Fig. 1 illustrates a typical arrangement of the transmission mechanism of the present invention in a vehicle embodying the same. The vehicle engine A is coupled to the driving wheels 10 of the vehicle through a fluid power-transmitting and main clutch unit B shown in greater particular in Fig. 3, and a change speed gearing C shown in detail in Figs. 4–18 inclusive. The mechanism C provides three speeds forward and a reverse drive and has under driver control an automatically operative direct drive ratio. The output shaft 12 of the unit C is connected by means of the usual propeller shaft 14 with a customary differential gear box 16 which drives the axle shaft 18. A 3.9 axle ratio is preferred.

As best seen in Fig. 3, we preferably arrange for transmitting drive from the engine A to the transmission C through clutch means comprising a fluid power-transmitting device such as the fluid coupling D of the kinetic type preferably in conjunction with a releaseable main clutch E of conventional design to facilitate certain manual shifts of the clutch sleeve F in the transmission C.

The engine crankshaft 20 (Fig. 3) drives the coupling impeller 22 to circulate fluid in its vaned passages to drive the vaned runner 24, in a manner well known for fluid couplings of the type illustrated. The runner 24 drives the input member or driving plate 26 of the main clutch E, which as illustrated is of the friction type. As shown, the driving plate 26 is drivingly connected with the runner 24 and to a clutch housing member 27. The driven member or mat 28 of the friction clutch E is fixed to the intermediate shaft 30 and is drivingly disengaged by depressing a clutch pedal 31 which slides the throwout 32, forwardly to operate lever 34 to unload the pressure driving plate 36, springs 38 loading this plate and engaging the clutch when the clutch pedal 31 is released.

The shaft 30 extends rearwardly into the housing or casing 40 of the transmission C (Figs. 4 to 6) where it is rotatably supported by a ball bearing 42 and is formed with a main drive pinion 44 at its inner end. Also formed on the rearward end of the shaft 30 adjacent the pinion 44 is an annular extension 45 to which is splined a pawl carrying member or core 46 of a centrifugal type pawl clutch generally designated by the letter G. A spring ring 47 holds this member in position. The rearward end of shaft 30 is hollow and journals by a bearing 48 the forward end 49 of the transmission driven shaft 12 which carries at its opposite end a propeller shaft brake drum 50 (Fig. 1).

The drive pinion 44 is in constant mesh with a gear 51 for driving the countershaft cluster 52 carried for rotation on a countershaft 54 supported in the casing 40. The cluster 52 includes a second or intermediate speed pinion 56, a first or low speed pinion 58, and a reverse drive pinion 60.

Figure 5:
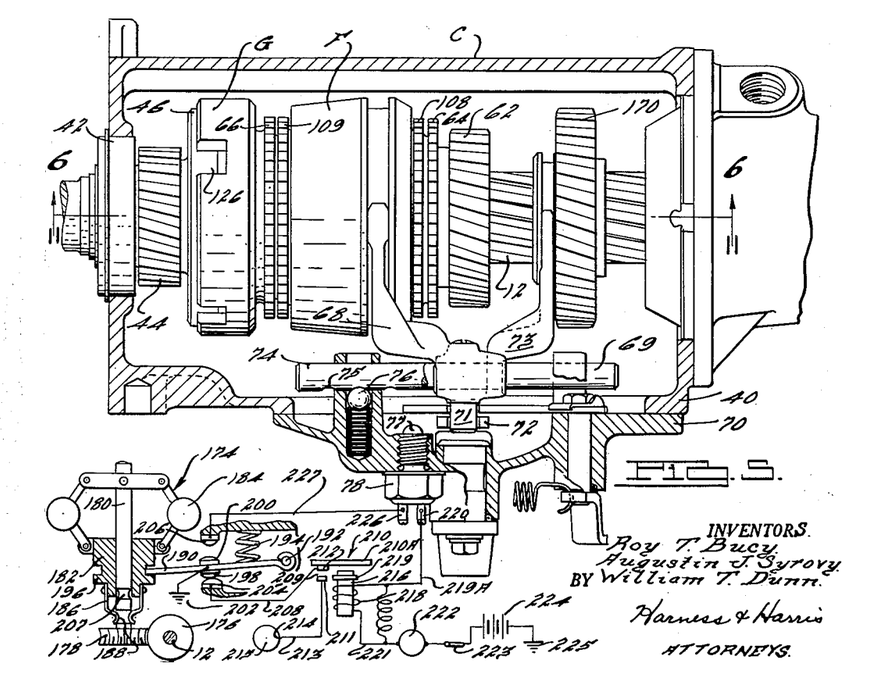
Fig. 5 is an enlarged horizontal view partly in section of the change speed transmission of our invention showing the manual shift selector mechanism and electrical control circuit for controlling automatic shifts.
Figure 7:
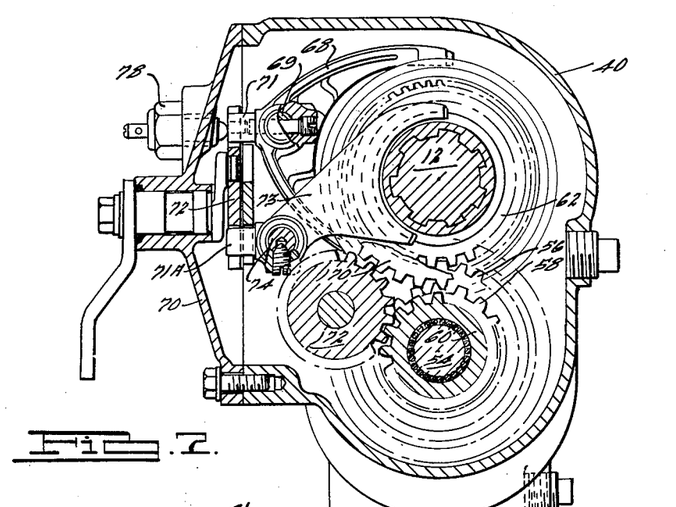
Fig. 7 is a cross-sectional view taken at line 7—7 of Fig. 6 showing the emergency low and reverse gearing.

The second speed pinion constantly meshes with a second speed gear 62 journalled for rotation on the shaft 12. This gear has a set of integral external clutch or drive control teeth 64, adapted for interengagement with a set of internal clutch or drive control teeth 65 of a manually shiftable clutch sleeve or member F which is adapted to be shifted rearwardly, axially of the shaft 12 from its neutral position to engage these teeth or forwardly to engage a set of integral external clutch or drive control teeth 66 of a centrifugal clutch shell generally designated by the numeral 67. The sleeve F is movable by a yoke member 68 (Fig. 5) fixedly secured to a second-direct shift rail 69 journalled in the removable cover 70 secured to the casing 40. The yoke 68 has a pin 71 which is engageable by selector mechanism including a rocker portion 72 carried by the cover 70 and fulcrumed about a pivot 71A similar to the pin 71 carried by the low-reverse yoke 73. The yoke 73 is fixedly carried on a shift rail 74 journalled in the cover 70. Both rails have three detent slots 75, one for each position of the respective shiftable members which slots are engageable by a spring-pressed detent or ball 76. Only the detent and slots for the low-reverse rail 74 are shown in Fig. 5, those for the rail 69 being of similar structure.

Figure 13:
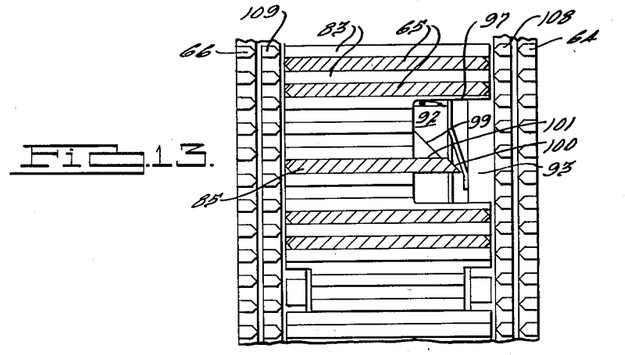
Figs. 13, 14, and 15 are sectional developments of the teeth of a portion of the manually shiftable clutch sleeve of Fig. 6 in relation to the clutching members and freewheel control cage, the said sections being taken on line 13—13 of Fig. 6 and showing the clutch sleeve in its neutral, freewheel second and direct, and two-way second speed ratio drive positions respectively.

When shifting the sleeve F forwardly to its freewheel second-direct position the plate 72 actuates a ball plunger 77 of a normally open switch 78 to close this switch and condition the transmission for automatic upshift and downshift between freewheel second and direct by the centrifugal pawl clutch G. The clutch sleeve F is slidably carried on a hub 79 which has a forward annular portion splined as at 81 on the driven shaft 12 and has a rearwardly extending annular portion 82. The hub has square-ended external teeth or splines 83 (see Figs. 6 and 13) spaced circumferentially to provide recesses or splineways 84 to receive the internal teeth of the sleeve F which as seen in Fig. 13 comprises the long teeth 65 and short tooth 85.

The hub portion 80 has an annular bearing sleeve 86 on which the clutch shell 67 is rotatably journalled and axially movable. The hub portion 82 has formed thereon internal cam faces 87 (see Figs. 6 and 8) to provide the outer race for rollers 88 of an overrunning clutch generally designated by the letter J. The gear 62 has a forward annular or hub portion 89 provided with a smooth external surface 90 which serves as the inner race or runway for the rollers 88. The rollers are carried in a cage 91 which has radially outwardly extending projections or tabs 92 (Fig. 8) received in end slots 93 formed in the rearward end flange 94 of the hub 79. Only one tab is shown but preferably two are provided 180 degrees apart.

Figure 8:
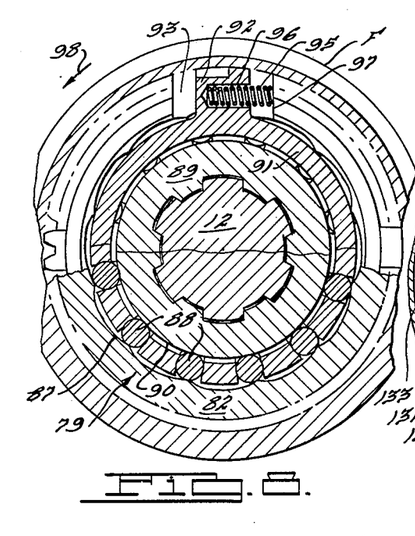
Fig. 8 is a cross-sectional view taken at line 8—8 of Fig. 6 through the freewheel clutch mechanism and control cage therefor.

Compression springs 95 seated in recesses 96 of the tabs 92 bear against side walls 97 of the hub slots 93 to bias the rollers 88 in the direction of the arrow 98 in Fig. 8 so as to normally tend to move the rollers into a locked-up driving position between the cams 87 on the hub 79 and the inner race 90 of the gear 62 to thereby establish a one-way driving connection between the gear 62 and shaft 12, upon tendency of the gear 62 to rotate faster than the shaft 12, in a forward direction, while permitting overrun of the shaft 12 with respect to the gear 62 upon slowing down of the gear 62 below the speed of the shaft 12.

Figure 14:
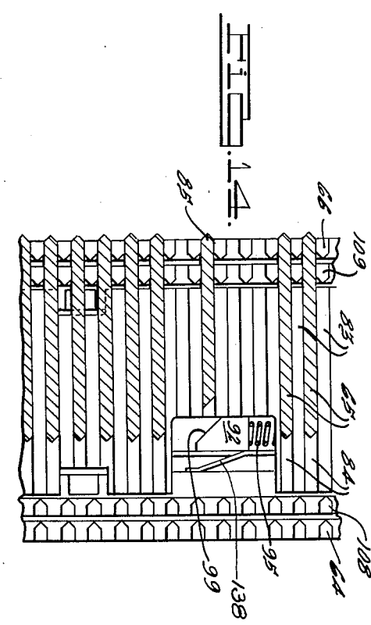
Figure 15:
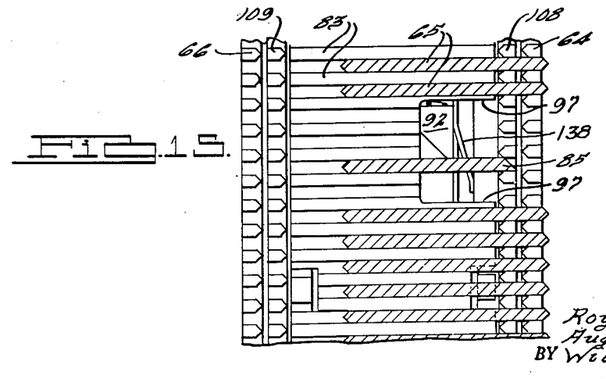

Operation of the clutch J is also under control of the sleeve F. Thus, as seen in Figs. 13–15, the tab 92 is formed with a cam surface 99 in the plane of the sleeve teeth and the short sleeve tooth 85 has its rearward end formed with a complementary cam surface or face 100. Moreover, certain sleeve teeth on opposite sides of the tooth 85 are cut away to prevent interference with the tab 92 when shifting the sleeve F rearwardly.

In the neutral position of the sleeve F shown in Fig. 13 the tab 92 is biased against the face 101 of the tooth 85 such that the rollers 88 are prevented from engaging the cam surfaces 87 of the outer race 82 and no-drive is possible in either direction through the freewheel clutch J.

In the rearward or two-way second speed position of the sleeve F shown in Fig. 15 the tab 92 is still retained in engagement with the sleeve tooth 85 and the clutch J is still in no drive.

In the forward or freewheel drive position of the sleeve F the sleeve tooth 85 is moved out of the path of the tab 92 so that the roller cage may assume a position with the roller engaged with the cam surfaces 87 to obtain one-way drive through the clutch J.

When returning the sleeve F to neutral position the face 100 of the sleeve tooth 85 will engage the cam surface 99 of the tabs 92 and will effect a clockwise rotation of the cage looking forwardly to the no-drive position shown in Fig. 13.

Intermediate its length the gear 62 is provided with a cone-shaped or frusto-conical surface 103. A similar surface 104 is provided at the rearward annular portion 105 of the pawl shell 67. Journalled on each of the surfaces 104, 105 are conventional rings 106, 107 respectively, provided with blocker synchronizing teeth 108, 109 respectively, of the same pitch diameter and diametrical pitch as the clutch teeth 64, 66, hub teeth 65, and sleeve teeth 83 so that the latter teeth are alignable with the blocker ring teeth.

Ring 106 is urged into frictional drive connection with the surface 103 of the gear 62 by a finger spring 110 positioned between the annular portion 94 of the hub 79 and the hub portion of the ring 106. A similar spring 111 is positioned between the central web portion 112 of the hub 79 and the hub of the ring 107.

The teeth 108 are engageable by the teeth 65 of the sleeve F for blocking rearward shift of the sleeve F when the relative speeds of the sleeve and gear 62 are asynchronous. Similarly the teeth 109 serve to block forward shift of the sleeve F when the relative speeds of the sleeve F and shell 67 are asynchronous. In order to maintain the ring teeth in blocking relationship under asynchronous condition, each ring has a radially outward lug 114 engaged in a slot 116 on the hub 79. The slots have sufficient circumferential length to permit the lugs 114 to oscillate between drive and coast blocking position as is well known. A plurality of lugs and slots may be provided if desired.

As seen in Figs. 13-15 the opposite ends of the sleeve teeth 65 are pointed in the conventional manner, also the forward ends of the teeth 64 and 108 and the rearward ends of the teeth 66 and 109. These facilitate blocker synchronizing and engagement of the interengageable teeth.

The centrifugal pawl clutch G comprises a pawl carrier 46 driven by the drive pinion 44, a plurality of pawls 120, two being shown, and a floating pawl shell 67 which may be drivingly connected to the shaft 12 by shifting the sleeve F forwardly to its freewheel second drive position into engagement with the teeth 66.

Figure 9:
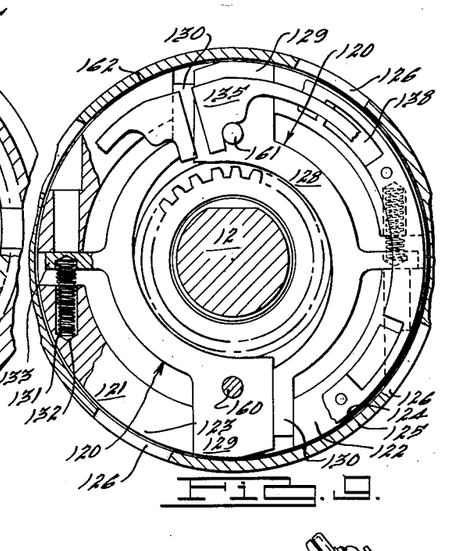
Fig. 9 is a cross-sectional view taken at line 9—9 of Fig. 6 showing the centrifugal pawl clutch mechanism and part of the pawl blocker.
Figures 10, 11:
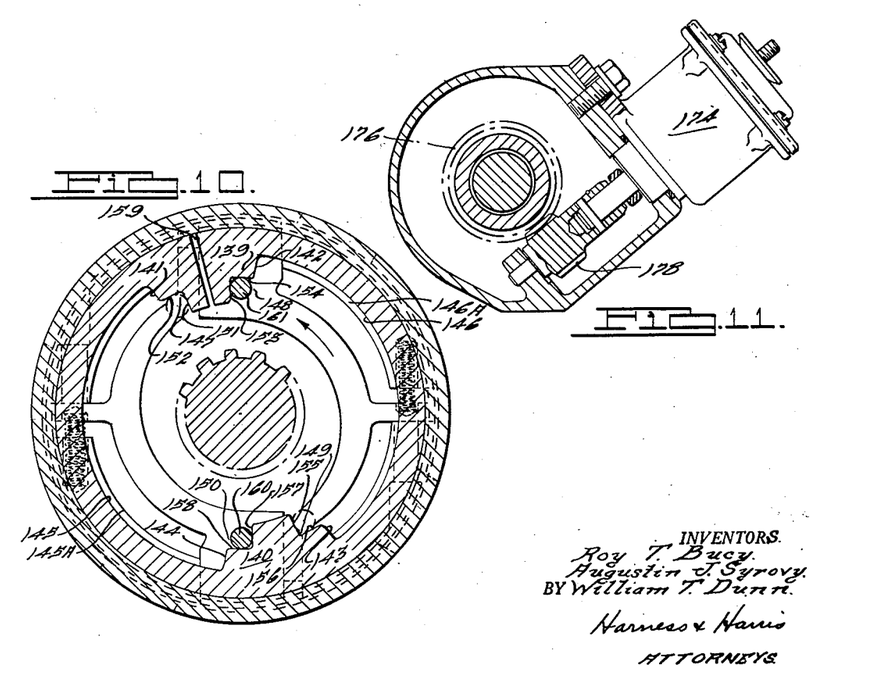
Fig. 10 is a cross-sectional view taken at line 10—10 of Fig. 6 through the blocker mechanism for the centrifugal pawls.
Fig. 11 is a cross-sectional view taken at 11—11 of Fig. 4 showing the governor and drive therefor.

As seen in Figs. 9 and 10, the rearward side of the pawl carrier 46 is provided with pawl guides 121, 122, which have arcuate faces 123, 124 which may journal the forward or overhanging end 125 of the shell 67. Slidably mounted between portions 121, 122 are a pair of radially movable pawls 120 which are adapted for outward movement oppositely to one another in response to centrifugal force to engage slots or windows 126 provided in the annular portion 125 of the floating shell 67 to establish a two-way direct drive between the shafts 30 and 12 when the sleeve F is clutched with the teeth 66 of the shell.

Preferably a plurality of pawl-receiving windows are provided. The number of windows is also preferably a multiple of the number of pawls. In the construction of Fig. 6 four pawl-receiving windows equally spaced circumferentially of the shell are shown.

Each pawl has a body portion 128 provided with a head or clutching portion 129 for engagement with the windows 126 and a tail portion 130 which acts as a guide for the head of the opposite pawl. The pawls are shaped that their radial movement is limited in either direction by engagement with the annular projection 45 and portions 121, 122.

In order to return the pawls to the disengaged position shown in Fig. 9 below a predetermined speed of rotation of the pawl carrier 46, a normal retracting bias is applied to the pawls to oppose their centrifugal tendencies in the speed range wherein disengagement of the pawls is desired. For this purpose, control or governor means comprising compression springs 131 are provided in recesses 132 of the carrier portions 121 and engage lateral wings 133 on the pawl bodies, to urge the pawls to retracted position. Adjustment of the engaging speed of the pawls may be made by replacing the springs 131 with new ones of different force values or by means of adjustment screws, as seen in the patent to E. R. Maurer, No. 2,343,312, granted March 7, 1944.

The pawl engaging windows 126 are preferably arranged such that diametrically opposite windows will simultaneously register with the pawls 120 so as to receive the pawls under the conditions hereafter described.

The pawls are preferably provided with a slight chamfer or ramp 134 at their outer head portions to reduce ratcheting tendencies when the pawls are free to engage.

A particular feature of our invention is the provision of means in the form of a combined blocker and drag member or balk synchronizing ring 135, for preventing pawl engagement until the rotative speeds of the pawls and shell are synchronized, and for preventing the establishment of a drive connection between the drive and driven shafts 30 and 12 through the freewheel J and between the shift sleeve and shell, under high engine idle conditions, as when the car is at a standstill, if forward shift of the sleeve F is either accidentally or deliberately attempted without first declutching and synchronizing the speeds of said shafts. The structure providing these features renders the transmission foolproof. It prevents undue loading of the freewheel device upon engagement and avoids breakage of parts.

As seen in Figs. 6, 9, and 10 the member 135 is in the form of a frusto-conical ring, the outer conical surface 136 of which is cut with a continuous oil groove formed by a fine pitch thread and arranged to frictionally contact a smooth complementary internal conical surface 137 provided on the annular forward projecting portion 125 of the clutch shell, just rearwardly of the windows 126. The ring is energized into frictional contact with the shell by resilient means, for example, a fingered spring 138 secured to the faces 121, 122 of the pawl carrier 46 and having a plurality of fingers biasing the ring 135 rearwardly.

The ring 135 has a pair of diametrically opposite radially inwardly directed lugs 139, 140, which are stepped to form narrow inner and wide outer lug portions. The base or outer lug portions of these lugs have side faces 141, 142 and 143, 144 respectively forming a step or shoulder or recess with circumferential lands 145, 146, the first of these lands as shown, connecting the faces 141, 144 to provide a circumferential recess 145A and the other connecting the side faces 142, 143 to provide a circumferential recess 146A. These lands are at the same distance from the axis of rotation. The lugs each have a further pair of steps forming recesses 147, 148, 149, 150 adjacent the inner lug portions. The steps 147 is formed by a side face 151 and land 152, the step 148 by face 153 and land 154, the step 149 by face 155 and land 156, and the step 150 by face 157, and land 158.

The member 135 is split by a radial slot 159 centrally of the lug 139 and may have a slight outward spring effect so as to assist the finger spring 138 to effect a normal light frictional contact between the conical surfaces 136, 137 such that under certain conditions hereinafter referred to, a friction drive in the same relative direction of rotation as the shell or the drive pinion 44 as the case may be will be impressed upon the ring 135.

The left hand pawl 120 in Figs. 9 and 10 is provided with a pin 160 and the right hand pawl with a pin 161. These pins are located at the same radial distance and rigidly fixed in the side faces of the pawls and project rearwardly into the vertical plane of the ring 135.

During asynchronous rotation of the pawls and shell, these pins lie in the path of the faces 151, 153, 155, 157 of the inner portions of the lugs 139, 140. When the pawls are engaged, the pins 160, 161 are positioned or received in the recesses formed by the lands 145, 146, respectively. The lands 145, 146 may, if desired, function as outer limit stops for the pins 160, 161 respectively, to limit the outward movement of the pawls. It will be observed that the lands 145, 146 extend over an arc of greater circumferential extent than the circumferential distance between any two pawl windows plus the pin diameters measured on the same arc as these lands. This permits the pawls to readily engage the nearest window under all relative positions of the pawls and windows.

When the centrifugal pawls 120 are below their engaging speed, the pins 160, 161 will be engaged with one or the other of the inner portions of the lugs 139, 140 depending upon the operating conditions prevailing in the transmission, and will prevent engagement of the pawls with the shell 67 even when the pawls reach their engaging speed until the pins become disengaged from the inner portions of the lugs.

When the clutch sleeve F is positioned in neutral and the vehicle is at a standstill with the engine idling, the pins 160, 161 will be engaged with the side faces 153, 157 respectively of the lugs 139, 140 so as to rotatively drive the member or ring 135 in the direction of the pinion 44. Engagement of the pawls at this time will be prevented by the faces 154, 158 of the lugs which will also prevent ratcheting of the pawls, clearance being maintained at this time between the outer ends of the pawls and the inner surface 162 of the shell 67. Due to the friction connection between the ring 135 and shell 67 and the friction connection between the blocking ring 107 and shell 67, these parts will also tend to rotate with the ring 135. The teeth 109 of the blocker ring 107 will therefore be rotated to the limit of the lost motion connection provided between the lug 114 of the blocker ring of the slot 116 in the hub 79, into blocking relationship with the teeth 65 of the sleeve F.

If the master clutch E be disengaged by depressing the clutch pedal 31 and the clutch sleeve F be moved forwardly to establish freewheel second drive ratio, engagement between the teeth of the sleeve F and the blocking ring 107 will transmit increased pressure at the conical surface 104 to bring the shell 67 to a standstill (the sleeve F being at this time stationary) and the teeth 65 of the sleeve F will thereupon pass between the teeth 109 of the blocker ring and into engagement with the teeth 66 of the shell 67. During this movement of the sleeve F into engagement with the teeth 66 the tooth 85 of the sleeve F will slide from engagement with the tab 92 of the freewheel control cage and, as seen in Fig. 14, the cage will be urged by the spring 95 into clutch lockup position whereby a drive may be transmitted from the gear 62 through the freewheel unit J to the hub 80 to the driven shaft 12. By reason of the engagement between the sleeve F and teeth 66, drive will also be impressed upon the shell 67.

Should for some reason the driver deliberately or accidentally shift the sleeve forwardly under the aforesaid conditions without however having released the master clutch, it will be impossible to synchronize the shell 67 with the sleeve F to permit engagement between the teeth of the sleeve and the teeth 66 of the shell because increased pressure between the blocker ring 107 and the shell 67 will also be imparted to the friction connection between the shell 67 and the member 135 since the member 135 is in drive relationship with the pinion 44 at this time. Hence asynchronous conditions will be maintained and engagement of the sleeve F with the teeth 66 and of the freewheel J will be prevented, thereby avoiding tooth breakage or other damage especially should the engine be operating at a high idle condition. It is to be noted that the length of the shell slots or windows 126 parallel to the axis of rotation of the clutch G is sufficient to allow for a substantial forward axial movement of the shell without interfering with the pawls 120. The construction provides for some permissible forward movement of the shell when pressure is applied between the sleeve and the blocker ring 107 so as to permit the drag pressure between the ring 135 and the shell to be built up by further compression of the finger spring 138, suitable means, for instance, the spring 138 being provided to limit the forward permissible movement of the shell 67, and member 135.

Engagement of the sleeve with the teeth 66 will also be prevented if a shift from two-way second speed ratio position is attempted while the vehicle is undergoing drive if the clutch E be not maintained released as the sleeve F passes through the neutral position.

Assuming that the clutch sleeve F has been shifted forwardly into engagement with the teeth 66 and the master clutch has been engaged, drive will be established as previously indicated in freewheel second drive. At this time the pawls 120 will be rotated faster than the shell 67 which is then being driven by the clutch sleeve F and the pins 160, 161 will drive the balk ring 135 at the speed of the pinion 44, the ring 135 slipping relative to the shell 67. As the vehicle is accelerated in freewheel second speed ratio drive, centrifugal force will tend to move the pawls 120 outwardly against the retracting effect of the springs 131, but they will be prevented from engaging the shell by the lands 154, 158 of the ring 135. Once the speed of the vehicle is at or above the engaging speed of the pawls if the driver then should relax pressure on the accelerator pedal 164 to move the throttle in a closing direction and thereby decelerate the engine, the pawl carrier 46 will slow down. When its speed becomes synchronized with the speed of the shell 67, or stated otherwise, when the speeds of the pawl carrier 47 and shell 67 cross each other the balk ring 135 will no longer be driven by the pawls but will be driven by the shell through its friction connection therewith and a relative motion will occur between the ring 135 and the pawl pins 160, 161 allowing the pins 160, 161 to slide off the lands 158, 154 respectively, and into the recesses 145A, 146A respectively, provided by the lands 145, 146. Should the pawls at this moment be aligned with the shell windows, engagement therebetween will immediately take place to establish a two-way direct drive between the shafts 30 and 12. However, should the pawls and windows be misaligned, the pins 160, 161 will move through the recesses 145A, 146A while the pawls rub against the surface 162 of the shell until the next nearest windows of the shell become aligned with the pawls whereupon engagement will take place. It is to be noted that the lands 145, 146 are of sufficient length to permit this operation to take place.

Once the pawls are engaged, the driver will again depress the accelerator pedal 164 and the vehicle will be driven in direct drive until such time as its speed drops below the engaging speed of the pawls 120 whereupon the springs 131 will urge the pawls to retract and such will occur just as soon as the driving pressure between the pawls 120 and the shell 67 is sufficiently relieved, provision being made for this to occur in a manner hereinafter to be described. As soon as the pawls become disengaged, the pins 160, 161 will again assume their position in the recesses 148, 150 respectively, and drive the ring 135 in the manner previously described.

Under coast torque conditions at or above the engaging speed of the pawls in freewheel second speed ratio drive the shaft 12 will become the driver and the tendency will be for the shell 67 to drive the balk ring 135 through its friction connection therewith such that the ring 135 will now rotatably lead the pawl carrier 46. Under these conditions the faces 151, 155 of the inner portions of the lugs 139, 140 of the ring 135 will become engaged with the pins 160, 161 respectively, and the balk ring will thereafter slip relative to the shell 67. The pins 160, 161 will at this time be in position relative to the lugs shown by the dotted lines in Fig. 10. Upon speeding up of the pawl carrier such that torque reversal occurs, or stated otherwise, the relative speeds of the carrier 46 and shell 67 become synchronized and cross each other, the pins 160, 161 will then tend to rotatably lead the ring 135 and will slide off the lands 152, 156 and enter the recesses provided by the lands 145, 146. Thereafter the pawls will become engaged with the shell windows as soon as these elements have become aligned with each other.

Spirally splined on the driven shaft 12 is a gear 170. This gear is operated by the yoke 73, Fig. 5, through a shift rail 74 when the sleeve F is in its neutral position. The gear 170 may be shifted forwardly to engage the pinion 58 of the countershaft cluster to establish a low speed or emergency low drive between the driving shaft 30 and the driven shaft 12, or may be shifted rearwardly into engagement with an idler gear 172 to establish reverse drive through the transmission. Emergency low speed ratio drive is a slower speed drive than the second speed ratio drive and is a faster drive than the reverse speed ratio drive. When shifting the gear 170 it will be understood that the clutch sleeve F will be locked in neutral position.

It has been previously pointed out that when the clutch sleeve F is moved forwardly, the projection 71 of the yoke 68 will close a switch 76 which is arranged in a control circuit for relieving the torque application on the pawls that is, reduce the same an amount sufficient to enable the springs 131 of Fig. 9 to retract the pawls to effect a downshift to freewheel second ratio drive. The instant control mechanism is made to accomplish this result by interrupting the engine ignition system.

The control mechanism comprises a governor generally designated by the numeral 174 driven by a worm 176 secured to the driven shaft 12 of the transmission (Fig. 4), through a worm wheel 178 secured to the governor shaft 180. The governor has a collar 182 which reciprocates axially on the shaft 180 in response to centrifugal movement of the weights 184. The collar 182 is held at low speeds of the vehicle by a detent 186 received in a groove 188 on the shaft 180. At predetermined speed of the vehicle the collar 182 will break away from the detent groove and actuate a lever 190 operably connected to the collar 182 and fulcrumed at the point 192, this lever being resiliently biased by a spring 194 into constant engagement with the lower flange 196 of the collar 182. The lever 190 carries switch contacts 198, 200 each connected to a ground 202 through the lever 190. The governor also has a fixed switch contact 204 which is engageable by the contact 198 at or below the vehicle speed at which the pawls of the centrifugal clutch are to be disengaged from the shell 67 for effecting a downshift in the transmission. Preferably the contact 204 will be engaged by the switch contact 198 at a vehicle speed at which the pawls would normally become retracted by the springs 131 were there no torque application on the pawls. The switch contact 200 is adapted to engage the fixed switch contact 206 at or above a vehicle speed at which the pawls of the centrifugal clutch are engageable. Preferably in order to provide direct drive at low car speeds, these contacts will be closed at approximately 12 M. P. H. in second speed ratio drive. When this car speed is reached, the detent 186 will release from the groove 188 with which it is engaged and allow the contacts 200, 206 to close at which time the detents 186 will engage in a second groove 207 on the shaft 180. When the governor slows down to the lower critical speed, the detents 186 will release from the groove 207 thereby causing switch contacts 200, 206 to open and the contacts 198, 204 to close.

The contact 204 of the governor switch is connected by a conductor 208 with a switch 209 operated by a measured time delay relay generally designated by the numeral 210. The switch 209 comprises stationary contact 211 and a contact 212 carried on the armature 210A. The conductor 208 connects the contacts 204, 212, and a conductor 213 connects the contact 211 with the primary coil terminal 214 of a distributor 215 in the engine ignition system. The relay has a core member 216 which is energized by a winding 218 and has a short-circuited coil 219 to which reference will hereinafter be further made. The winding 218 connects by a conductor 219A with a terminal 220 of the manually controlled switch 78 and also connects by a conductor 221 with the ammeter 222 which in turn is in series with an ignition switch 223, one side of this switch connecting with a source of electrical power such as a storage battery 224, one side of which is grounded at 225. The other terminal 226 of the manually operable switch 78 connects by a conductor 227 with the contact 206 of the governor switch mechanism.

As previously stated, the contacts 200, 206 of the governor will preferably close at a vehicle speed at which the pawls 120 are adapted to become engaged. Since at this time the ignition switch 223 and the manual switch 78 will both be closed, a circuit will be established between the battery and the ground 202 through the ignition switch 223, ammeter 222, conductor 221, relay coil 218, conductor 219, switch 78, conductor 227, governor contact 200, and ground 202 causing current to flow through the relay winding 218 to energize the core 216 and pull the armature 210A into contact with the core 216 to close the relay switch 209 thereby forming a continuous circuit from the governor contact 204 through the conductor 208, switch 209, conductor 213 to the primary winding terminal 214 of the distributor 215. Closing of the switch 209 serves in effect to condition the ignition circuit for interruption since the contact 198 of the governor switch mechanism is connected to ground 202 and grounding of the primary coil of the ignition will take place when the governor contacts 198, 204 are brought into engagement while the relay switch 209 is also closed. In the described structure the switch 209 will not open until a predetermined time after opening of the governor switch contacts 200, 206. This predetermined time is measured by the characteristics of the relay 210. The lag or time delay between the opening of the contacts 211, 212 is effected by causing the armature 210A to seal against the core 216 of the relay when the contacts 200, 206 of the governor switch are closed thereby making it necessary for the magnetic flux in the core 216 to diminish to substantially zero before the armature 210A will be released to open the relay switch 209. Decay of flux in the core 216 is retarded by the short-circuited coil 219.

Consequently, when the governor contacts 200, 206 open and the governor contacts 198, 204 close, the relay contact switch 209 will still be closed and current to the ignition system will be interrupted by grounding of the primary coil of the distributor. The overcenter or snap action of the governor avoids hunting and reduces to a minimum the time interval between opening of one set of governor contacts and closing of the other such that the relay switch 209 will remain closed for a sufficient time to effect ignition interruption. The interruption of the engine ignition current eliminates the igniting of several fuel charges whereby the engine ceases to drive the vehicle and the torque application on the pawls 120 of the centrifugal clutch is relieved sufficiently to facilitate their retraction by the springs 131. It will be understood that the governor contacts 198, 204, will preferably close at that vehicle speed at which the pawls 120 of the centrifugal clutch would be normally retracted by the springs 131 were it not for the torque application on the pawls. This will generally be at a vehicle speed of approximately 10 to 11 M. P. H. corresponding to an engine speed of approximately 500 R. P. M. in direct speed ratio drive.

As soon as the magnetic flux in the core 216 has decayed sufficiently the armature 210A of the relay 210 will be released to re-open the contacts 211, 212 of the switch 209 and thereby re-establish the ignition circuit thereby permitting normal functioning of the engine.

It will be understood that in all speed ratio drive conditions of the transmission other than freewheel second and direct, the switch 78 will be open inasmuch as engagement of the centrifugal clutch at such times will not have any effect on the operation of the transmission, and ignition interruption would then not be desirable.

*Operation*

In describing the operation of the transmission structure heretofore set forth, let it be assumed that the clutch sleeve F and the low reverse gear 170 are both in neutral positions, the main or friction clutch E is engaged and the engine is idling at approximately 450 R. P. M. Under these conditions the impeller 22 of the fluid coupling D will rotate at engine speed. There will be very little slip in the coupling at this time due to the drag of the coupling seal 230 (Fig. 3) between the impeller and runner and the light load imposed on the coupling at this time. Consequently the pawl carrier 46 and pawls 120 will rotate at a speed slightly under engine speed but not sufficiently high to effect centrifugal movement of the pawls against the bias of the springs 131. In any event even if a high engine idle condition exists the pawls will not overrun the pawl windows of the shell because their outward movement is blocked by the balk ring 135 as previously described. Moreover, there will be no drive between the gear 62 and the clutch sleeve F since the sleeve F is in neutral position and the clutch J is neutralized by the tooth 85 of the sleeve such that no drive is possible through the freewheel unit J in either direction.

In order to obtain forward movement of the vehicle, the driver will first release the main clutch E by depressing the clutch pedal 31 so as to permit shifting of the transmission into one or another of the starting drive conditions. Thus if a low speed ratio drive is required the gear 170 will be manually shifted into engagement with the pinion 58 and a low speed drive will be established between the engine and the driven shaft 12 through the fluid coupling D, master clutch E, drive pinion 44, gear 51, pinion 58, gear 170, and shaft 12.

Reverse speed drive may be obtained by shifting the gear 170 rearwardly of its position in Fig. 6 into engagement with the idler gear 172 and reverse drive will thereupon be established between the engine and the driven shaft 12 through the fluid coupling D, master clutch E, drive pinion 44, gear 51, pinion 60, idler 172, gear 170, and shaft 12. It will be understood that when shifting the gear 170 for obtaining either low speed or reverse, the master clutch will first be released and will be re-engaged after the shift has been completed.

Shift from low speed ratio drive into a faster speed ratio drive may be obtained by releasing the master clutch E and returning the gear 170 to its neutral position and then shifting the clutch sleeve F either forwardly to obtain freewheel second ratio drive or rearwardly to obtain two-way second speed ratio drive. In shifting the sleeve F rearwardly the teeth 65 of the clutch sleeve will encounter the blocker synchronizer teeth 108 of the blocker ring 106. During this shifting movement the tooth 85 of the clutch sleeve will continue to hold the freewheel clutch J in neutral or no drive condition. If the shift is made with the vehicle at a standstill the effect of engagement between the sleeve and blocker is to synchronize the gear 62 to the speed of the driven shaft by causing the blocker ring to bring the gear 62 and its connected parts to and including the driven side of the master clutch E to a standstill such that the teeth of the sleeve may pass between the teeth of the blocker into engagement with the clutch teeth 64 of the gear 62. If the shift is being made from low speed ratio drive to second speed ratio drive, the action of the blocker synchronizer will be to slow down the speed of the gear 62 to that of the shaft 12 whereupon engagement of the sleeve F with the clutch teeth 64 may take place.

It will be observed that so long as the speeds of the sleeve F and the gear 62 are asynchronous the blocker ring 106 will be brought into blocking relationship with the teeth of the clutch sleeve through the lug 114 and slot 116 connection between the blocker ring and the hub 80 supporting the clutch sleeve. Thus in the shift into two-way second with the vehicle at a standstill the blocker ring 106 will be driven through its friction connection 103 by the gear 62 into its drive block position. A similar action will occur if the shift be made from low speed ratio drive to two-way second at a time when the gear 62 is rotating faster than the driven shaft 12. If the shift into two-way second from low speed ratio drive is made while the vehicle is coasting such that the shaft 12 will be rotating faster than the gear 62, the slot 116 of the clutch hub will pick up the lug 114 of the blocker ring and drive the blocker ring in a manner such that it is in coast blocking relationship to the teeth of the sleeve.

In order to start the vehicle from standstill in freewheel second speed ratio drive, the driver will first release the main clutch E and then shift the clutch sleeve F forwardly. The sleeve teeth 65 will encounter the blocker teeth 109 and through these teeth apply pressure between the ring 107 and friction surface 104 of the pawl shell 67 and between the balking member 135 and the friction surface 137 of the shell, to enable synchronizing of the shell with the stationary shaft 12. As soon as this takes place the sleeve F may pass by the blocker teeth 109 into engagement with the clutch teeth 66 of the shell 67, and the tooth 85 of the sleeve will release the control cage of the freewheel clutch J such that the clutch J may assume its locked position and establish a freewheel drive between the engine and the shaft 12 through the fluid coupling D, master clutch E, drive pinion 44, gear 51, pinion 59, gear 62, freewheel clutch J, clutch hub 80, and shaft 12 when the master clutch E is re-engaged. The shift of the sleeve F into the automatic upshifting second speed gear from neutral is thus a synchronized shift. The driver may now accelerate the vehicle in freewheel second speed ratio drive by depressing the accelerator pedal 164 and operate in this ratio for as long a time as he desires, the various elements including the pawl carrier 46 being speeded up as the engine speed is increased by further throttle opening of the accelerator during this breakaway drive.

As the engine and vehicle speed is increased, the pawls 120 will overcome the biasing effect of the control springs 131 and will try to move outwardly to engage the shell 67 but will be restrained from so doing by the balk ring 135 in the manner heretofore described. Engagement of the pawls to establish direct drive will result when the driver releases the accelerator pedal sufficiently to effect a partial closing of the engine throttle so as to decelerate the engine and runner 24 of the fluid coupling as well as the pawl carrier 46 to synchronize the carrier speed with the speed of the shell 67 which is at this time being driven at a lower speed than the carrier 46 through the gear 62. As the speeds of the carrier and shell become synchronized and cross each other, the shell through its friction connection with the balk ring 135 will effect a relative movement between the pins 160, 161 and the ring to disengage the pins from the lands 154, 158. The pawls will then enter the windows of the shell as soon as they become aligned therewith to establish direct drive. This is a two-way positive drive permitting coasting against the engine or starting of the vehicle by towing.

During speedup of the vehicle in freewheel second to the engaging speed of the pawls, the governor 174 driven from the shaft 12 of the transmission was operated to open the contacts 198, 204 (Fig. 5) and close the contacts 200, 206. The manual switch 78 being closed, a circuit is established energizing the coil 218 of the relay 210 and drawing the armature 210A against the core 216 to close the relay switch 209. When the speed of the vehicle drops below the engaging speed of the pawls, for example, to a speed of about 10 M. P. H. the springs 131 will act to retract the pawls from engagement with the shell 67. At the same time, the governer 174 will have operated to disengage the contacts 200, 206 and engage the contacts 198, 204 thus applying a ground to the primary coil terminal of the distributor through the relay switch 209 to interrupt the ignition and thereby relieve any drive torque existing between the pawls 120 and the shell 67 of the centrifugal clutch G. During the period of ignition interruption the relay switch 209 remains closed by reason of the delay in flux decay in the core 216. However, this delay is only a matter of a fraction of a second and as soon as sufficient flux decay has occurred the armature 210A of the relay will be returned to its normal position wherein the switch 209 is open. Upon disengagement of the pawls 120 the vehicle will be again established in freewheel second drive ratio, the freewheel clutch J having automatically established a drive in this ratio upon release of the pawls from engagement.

Should it be desired to shift the transmission from its positive drive in direct drive ratio into a lower positive drive, for example, two-way second speed ratio drive, the driver will first release the master clutch E to thereby relieve the driving torque between the teeth of the sleeve F and the clutch teeth 66 of the shell 67 whereupon the sleeve F may be shifted rearwardly into blocker synchronizing relationship with the blocker ring 106. During this rearward movement of the sleeve the freewheel clutch J will be neutralized by the tooth 85. The shaft 12 which is rotating at a higher speed than the gear 62 will effect a drive of the clutch hub so as to rotatably lead the blocking ring 106 and bring the teeth 108 into coast blocking relationship with the teeth 65 of the sleeve F. Upon application of pressure to the blocking ring 106 by the sleeve F the speed of the gear 62 will be increased to synchronize with that of the shaft 12 and as soon as this occurs the teeth 65 of the sleeve F will pass between the blocker teeth 108 into engagement with the teeth 64 of the gear 62. Upon re-engagement of the master clutch E and depression of the accelerator pedal, the vehicle will be driven in two-way second speed ratio drive.

So long as the speed of the pawl carrier 46 remains above the pawl engaging speed, the pawls will remain in engagement with the shell and a subsequent shift may be readily made from two-way second to direct drive by declutching and synchronizing the speeds of the shaft 12 and the shell 67, this requiring a slowing down of the shell 67 to the speed of the shaft 12. Shifts between freewheel second ratio and two-way second or vice versa may be made under drive or coast conditions preferably accompanied by release of the clutch E to relieve torque on the sleeve teeth if the shift is made under engine drive conditions and to facilitate synchronizing of the second speed gear with the sleeve under coast condtions. In both cases the freewheel clutch J control cage will be actuated by the sleeve F between the freewheel second and neutral positions of the sleeve.

Figure 12:
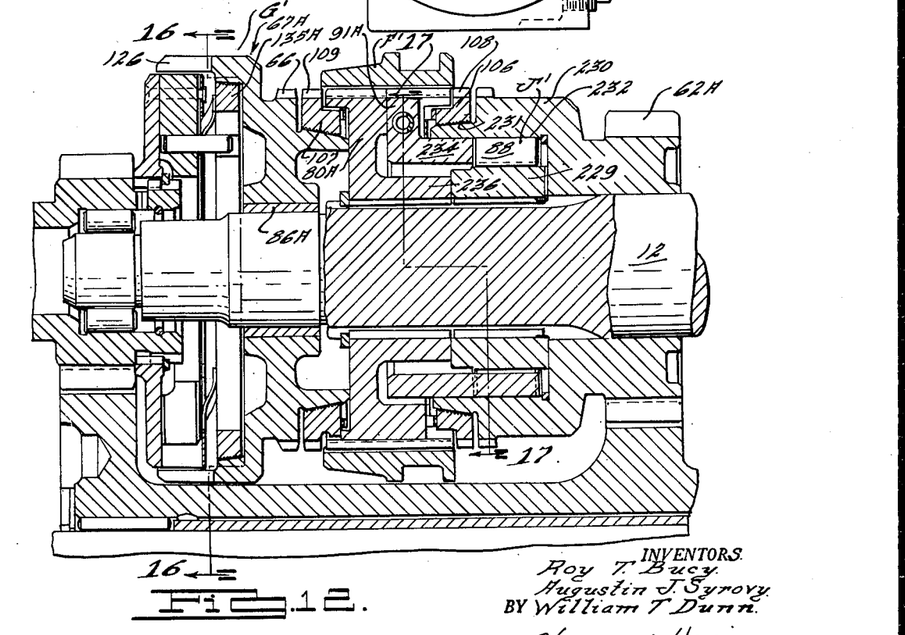
Fig. 12 is a detailed enlarged view taken similarly to that in Fig. 6 of a portion of the mechanism of Fig. 4 showing a modified underdrive structure.
Figures 16, 17:
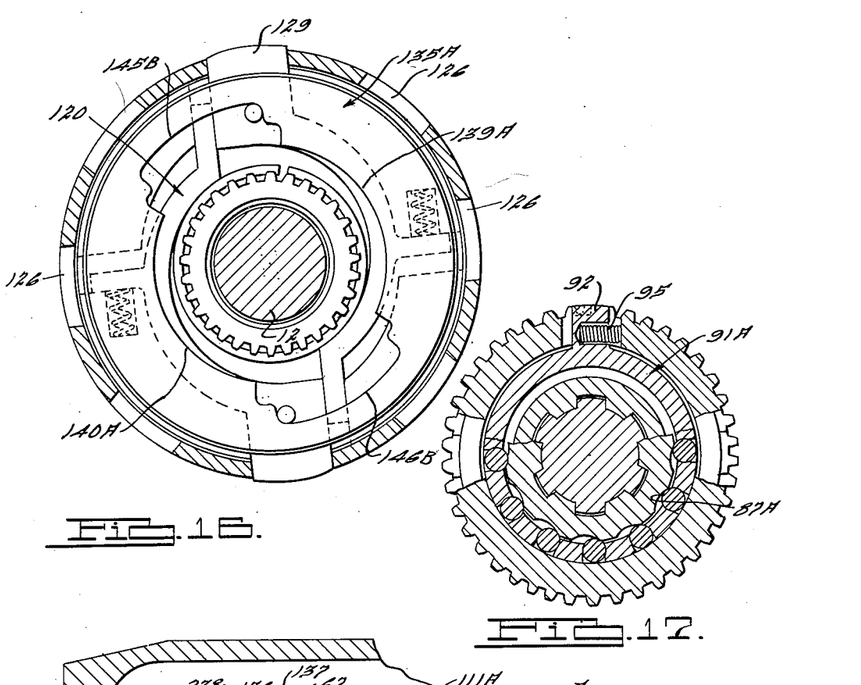
Fig. 16 is a cross-sectional view taken at line 16—16 of the modification in Fig. 12 showing the centrifugal clutch and blocker mechanism.
Fig. 17 is a cross-sectional view taken at line 17—17 of the modification in Fig. 12 showing the freewheel clutch mechanism and control cage therefor.

Fig. 12 illustrates a modification of the second-direct mechanism shown in Figs. 6 and 10 inclusive. Thus, for example, the shell 67ᴬ of the centrifugal pawl mechanism G' is directly journalled on a bushing 86ᴬ carried by the shaft 12. As seen in Fig. 16, this shell is provided with eight pawl-receiving windows as distinguished from the four windows of the Fig. 6 construction. The use of eight windows is advantageous in that it enables a quicker engagement of the pawl clutch mechanism once the pawl carrier and shell have been synchronized in speed and prevents a clunk in engagement between pawl and shell by minimizing the slight out of synchronism effect possible where the pawls must move 90 degrees for engagement after reversal in relative rotation between shell and pawls takes place. It also reduces the length of the pawl pin recesses on the friction balking member or ring 135ᴬ as will be evident from Fig. 16 wherein the member 135ᴬ is shown to be a solid continuous ring having broad stepped blocking lugs 139ᴬ and 140ᴬ between which circumferentially speaking, are provided the lands 145ᴮ, 146ᴮ which may be shorter by reason of the reduced angular distance between adjacent windows of the shell.

The freewheel clutch structure is somewhat simplified in that an external cam arrangement is provided in lieu of the internal cam construction required in Fig. 6. Moreover, it becomes possible without complication to make the roller cam structure in the form of a separate ring 229 keyed to the shaft 12. This avoids use of more expensive material than in the case of the Fig. 6 construction wherein the hub 80 must embody the internal cam construction. The new arrangement also facilitates assembly of the roller clutch mechanism and shortens up the second-direct mechanism to thereby permit use of shorter countershaft members with resulting increase in stiffness of the mechanism. More specifically, it will be noted that the second speed gear 62ᴬ has an enlarged forwardly extending portion 230 carrying the second speed clutching teeth 64ᴬ and providing an external cone 231 on which is frictionally journalled the blocker ring 106. The portion 230 is bored with a smooth annular surface 232 providing the inner runway or driving surface for the roller clutch J'. The inner race 229 of the roller clutch J' is provided, as seen in Fig. 17, with a cam surface 87ᴬ on which the rollers 88 are carried. The rollers 88 are retained in a cage 91ᴬ having a rearward slotted annular extension 234 for separating the adjacent rollers. The radially extending finger 92, spring 95 are of similar construction to that of the Fig. 8 arrangement, the finger being chamfered in the manner of the finger of the Fig. 8 construction, as shown in Figs. 13, 14, and 15 to provide for camming of the cage by the clutch sleeve F' in the same manner that the cage is controlled by the clutch sleeve F in the Fig. 6 construction. It will also be noted that the hub 80ᴬ in Fig. 12 has a rearward extension 236 instead of the forward extension, as shown in Fig. 6. The blocker rings 106, 107 have radial lugs engaging in clocking slots of the hub 80ᴬ in the same manner as the similar rings of the Fig. 6 construction. The arrangement in Fig. 12 also makes it possible to use a shorter clutch sleeve.

The portion of the transmission mechanism omitted in Fig. 12 is similar to that in Fig. 6 and the Fig. 12 construction is operated in the same manner as described above with respect to that of the Fig. 6 construction.

Figure 18:
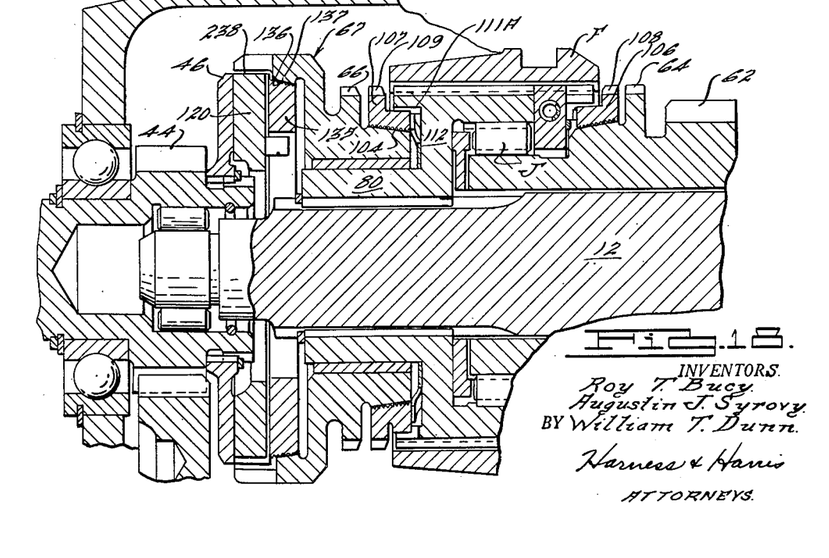
Fig. 18 is an enlarged view similar to that in Fig. 6 showing the use of a single energizing means for the pawl and sleeve blocker mechanism.

In Fig. 18 we have shown a further modification, the structure here being very similar to that in Fig. 6 with the exception that in Fig. 18 the finger spring 138 employed for energizing the friction ring or member 135 is omitted and a single energizing spring 111ᴬ between the web 112 of the hub 80 and the blocker ring 107 is provided for simultaneously energizing both the blocker ring 107 and the friction balk ring member 135. In the Fig. 18 arrangement the forward end face 238 of the balk member 135 abuts the rearward faces of the pawl guides 121, 122. Thus the spring 111ᴬ acts to urge the blocker ring 107 forwardly into pressure contact with the conical friction surface 104 of the shell, this pressure in turn urging the shell 67 forwardly to have its conical surface 137 engage the conical surface 136 of the balk member 135, the carrier guides 121, 122 serving as a stop for the member 135 to make this simultaneous energization of both friction members possible.

The operation of the Fig. 18 construction is the same as that described for Fig. 6.

From the above description, it will be seen that we have provided a novel transmission of semi-automatic character particularly useful for low-priced cars and that has a novel clutching mechanism providing all necessary and desirable driving functions and that is foolproof in operation. Although the particular structures shown and described above are well adapted for carrying out the various objects of our invention, it will be understood that various modifications, changes and substitutions may be made without departing from the spirit thereof. The subject invention is, therefore, to be construed to include all such modifications, changes, and substitutions as may come within the scope of the following claims.

We claim:

1. In a variable speed power transmission a drive shaft, a driven shaft, means for driving the driven shaft from said drive shaft, said driving means including a first pair of interengageable clutching members and a second pair of interengageable clutch members, one of each pair being drivingly connected and means for preventing engagement of said clutches when the rotative speeds of the other members of said pairs of clutch members are asynchronous said last means comprising a pair of frictionally driven rings energizable by one of said clutching members other than said drivingly connected members.

2. In a variable speed power transmission a drive shaft, a driven shaft, means for driving the driven shaft from said drive shaft, further means for driving the driven shaft from said drive shaft, said first-mentioned driving means including a one-way clutch engageable for establishing this drive, said further driving means including a first pair of interengageable clutching members and a second pair of interengageable clutching members one of each pair being drivingly connected and means for preventing engagement of said one-way clutch except when the rotative speeds of the other members of said pairs of interengageable clutch members are synchronous.

3. In a variable speed power transmission for driving a vehicle having an engine, rotatable clutch means manually shiftable from a neutral position to establish a drive arrangement, a centrifugally operable pawl clutch engageable to establish a further drive arrangement when said manual clutch means has established said first-mentioned drive arrangement, said pawl clutch comprising a pawl carrier having centrifugally responsive pawls and a freely rotatable pawl-receiving member adapted to be clutched by said manually shiftable clutch means when establishing said first-mentioned drive arrangement, and means including a pair of frictionally driven rings energizable by said manually shiftable clutch means and an element under control of the pawl carrier for preventing establishment of said further drive arrangement so long as the relative rotative speeds of said carrier member and clutch means are asynchronous.

4. In a variable speed power transmission, gear means, manually operable clutch means shiftable from a neutral position to selectively establish either a one-way or a two-way relative drive arrangement, a centrifugally operable pawl clutch engageable to establish a further drive arrangement when said manual clutch means is established in said one-way drive arrangement, said pawl clutch comprising a pawl carrier having centrifugally responsive pawls, and a freely rotatable pawl-receiving member adapted to be clutched by said manually shiftable clutch means in its said one-way drive position, blocker-synchronizing means between said shiftable clutch means and said pawl-receiving member and synchronizing means between said pawl carrier and pawl-receiving member, both said synchronizing means comprising frictionally driven rings energizable by said manually shiftable clutch means.

5. In a variable speed power transmission for driving a vehicle having an engine, manually operable clutch means shiftable from a neutral position to establish a drive arrangement, a centrifugally operable pawl clutch engageable to establish a further drive arrangement when said manual clutch means has established said first-mentioned drive arrangement, said pawl clutch comprising a pawl carrier having centrifugally responsive pawls and a freely rotatable pawl-receiving member adapted to be clutched by said manually shiftable clutch means when establishing said first mentioned drive arrangement, blocker-synchronizing means between said shiftable clutch means and said pawl-receiving member, and friction driving means between said pawl carrier and said pawl-receiving member energizable by said shiftable clutch means.

6. In a power transmission, a drive shaft, a driven shaft, a rotatable shell member freely rotatable relative to said driven shaft, and having a set of clutching teeth, centrifugal pawl means for drivingly connecting said shell member and drive shaft, a hub member drivingly connected to said driven shaft, means including an overrunning clutch for establishing a one-way drive connection between said drive shaft and said hub around said shell member, a movable clutching member non-rotatably carried by said hub and having clutching teeth movable into engagement with the clutching teeth of said shell to establish a driving connection therewith and movable to disengage this connection, a friction blocker-synchronizing ring journalled on said shell member intermediate said hub and shell clutching teeth, and a frusto-conical friction synchronizing ring journalled by said shell and adapted for direct drive by said pawl means, said movable clutching member being also operable during said tooth engaging movement for establishing said one-way drive connection and operating to energize both said rings for facilitating establishment of said drive connections.

7. In a power transmission, a drive shaft, a driven shaft, a rotatable shell member freely rotatable relative to said driven shaft and having a set of clutching teeth, centrifugal pawl means for drivingly connecting said shell member and drive shaft, a hub member drivingly connected to said driven shaft, a movable clutching member non-rotatably carried by said hub and having clutching teeth movable into engagement with the clutching teeth of said shell to establish a driving connection therewith and movable to disengage this connection, a friction blocker-synchronizing ring journalled on said shell member intermediate said hub and shell clutching teeth, a friction synchronizing ring journalled by said shell and adapted for drive by said pawl means, resilient means operable intermediate said pawl means and ring for energizing said last-mentioned ring and resilient means operably intermediate said hub member and blocker-synchronizing ring for energizing the latter, the friction pressure action of said resilient means upon said rings being subject to increase upon movement of said clutching member to engage said shell clutching teeth during asynchronous rotation of said shafts.

8. In a power transmission, a drive shaft, a driven shaft, a freely rotatable shell member having a set of clutching teeth, centrifugal pawl means for drivingly connecting said shell member and drive shaft, a hub member drivingly connected to said driven shaft, a movable clutching member non-rotatably carried by said hub and having clutching teeth movable into engagement with the clutching teeth of said shell, a friction blocker-synchronizing ring journalled on said shell member intermediate said hub and shell clutching teeth, a friction synchronizing ring journalled by said shell and adapted for drive by said pawl means, resilient means operable intermediate said pawl means and pawl driven ring for energizing said ring and resilient means operably intermediate said pawl means and blocker-synchronizing ring for energizing the latter, said shell being axially movable in response to clutch engaging movement of said movable clutching member for manually energizing said synchronizing rings.

9. In a power transmission, a drive shaft, a driven shaft, a rotatable shell member freely rotatable relative to said driven shaft and having a set of clutching teeth, centrifugal pawl means for drivingly connecting said shell member and drive shaft, a hub member drivingly connected to said driven shaft, a movable clutching member non-rotatably carried by said hub and having clutching teeth movable into engagement with the clutching teeth of said shell to establish a driving connection therewith and movable to disengage this connection, a friction blocker-synchronizing ring journalled on said shell member intermediate said hub and shell clutching teeth, a frusto-conical friction synchronizing ring journalled by said shell and adapted for driving engagement by said pawl means and a spring member intermediate said blocker-synchronizing ring and said hub of sufficient force value to energize both said synchronizing rings.

10. In a variable speed power transmission, a drive shaft, a driven shaft, change speed mechanism for drivingly connecting said shafts, said mechanism comprising centrifugally engageable clutch means for driving the driven shaft at the speed of the drive shaft, means including a one-way roller clutch for driving the driven shaft at a slower speed than the drive shaft when said centrifugal clutch means is disengaged, said means including a movable clutch member for establishing said mechanism in neutral and in a two-way drive in said slow speed drive and including cam means operable upon said roller clutch for positively establishing said roller clutch in no-drive condition as an incident to moving said movable clutch member for establishing said neutral and two-way slow speed condition in said mechanism.

11. In a variable speed power transmission, coaxial drive and driven shafts, a hub member rotatable with said driven shaft, an axially movable clutch sleeve non-rotatably carried by said hub member, a first toothed clutching member rotatably journalled on said driven shaft, means drivingly connecting said first toothed member to said drive shaft, a second toothed clutching member journalled on said hub member and having an annular portion provided with a pawl-receiving opening, a pawl-carrying core driven by said drive shaft, a centrifugal pawl rotatably carried by said core and movably responsive to centrifugal force upon rotation of said core to engage said opening, and a one-way roller clutch comprising an internal roller cam-faced raceway on said hub member, an external smooth-faced roller raceway on said first clutching member, and an intermediate roller carrier having a lug axially intermediate the roller clutch and said first toothed clutching member engageable with said sleeve for controlling said roller clutch so as to render said roller clutch in no drive condition when said sleeve is engaged with said first or said second toothed clutching member.

12. In a variable speed power transmission, coaxial drive and driven shafts, a hub member rotatable with said driven shaft, an axially movable clutch sleeve non-rotatably carried by said hub member, a first toothed clutching member rotatably journalled on said driven shaft, means drivingly connecting said first toothed member to said drive shaft, a second toothed clutching member rotatably journalled on said driven shaft, and having an annular portion provided with a pawl-receiving opening, said first and second toothed members being selectively engageable by said clutch sleeve, a pawl carrying core driven by said drive shaft, a centrifugal pawl rotatably carried by said core and movably responsive to centrifugal force upon rotation of said core to engage said opening, and a one-way roller clutch comprising an annular member rotatable with said driven shaft and having an external cam-faced raceway, a smooth-faced internal raceway on said first clutching member, and an intermediate roller carrier having a lug axially intermediate the hub and said first toothed clutching member engageable with said sleeve for controlling said roller clutch so as to render said roller clutch in no-drive condition when said clutch sleeve is disengaged from both said toothed members or engaged with said first toothed member.

13. In a power transmission, coaxial drive and driven shafts, a first toothed clutch means journalled on said driven shaft, a second toothed clutch means adapted for drive connection with said drive shaft, a hub member drivingly connected to said driven shaft, said hub member having a slot, a clutch sleeve splined to said hub and shiftable in one direction from a neutral position to interengage with said first clutch means or in the opposite direction to interengage with said second clutch means, said sleeve having long clutching teeth and a short camming tooth, a one-way roller clutch arranged for drivingly connecting said first clutch means and said driven shaft, said roller clutch having a control cage rotatable to condition said roller clutch for drive or no drive, said cage having a radial lug arranged to extend through said hub slot and having a cam face engageable with said cam tooth for rotating said control cage to establish said roller clutch in no drive condition, said cam teeth having a length and being operable to rotate said cage to its no drive position when said clutch sleeve is shifted into said neutral position or into engagement with said first clutch means and being operable to disengage from said lug to permit rotation of said cage to its drive establishing position when said clutch sleeve is shifted into engagement with said second clutch means, and resilient means for biasing said roller cage in a direction to establish drive through said roller clutch.

14. In a variable speed power transmission coaxial drive and driven shafts, a hub member rotatable with said driven shaft, an axially movable clutch sleeve non-rotatably carried by said hub member, a first toothed clutching member drivingly connected to said drive shaft and rotatably journalled on said driven shaft, a second toothed clutching member journalled on said hub member and having an annular flange portion provided with a pawl-receiving opening, and an internal conical friction surface, a friction ring having an external conical surface nesting with the conical surface of said clutching member and having an inwardly directed lug, a pawl-carrying core driven by said drive shaft, a centrifugal pawl rotatably carried by said core and movable outwardly in response to centrifugal force upon rotation of said core to engage said opening of said second clutching member, a lateral projection on said pawl engageable with said lug, and a one-way roller clutch comprising an annular member rotatable with said driven shaft and having an external cam-faced raceway, a smooth-faced internal raceway on said first clutching member, and an intermediate roller carrier having a lug engageable with said sleeve for controlling said roller clutch.

15. In a variable speed power transmission coaxial drive and driven shafts, a hub member rotatable with said driven shaft, an axially movable clutch sleeve non-rotatably carried by said hub member, a first toothed clutching member and rotatably journalled on said driven shaft, means drivingly connecting said first toothed member to said driving shaft, a second toothed clutching member journalled on said hub member and having an annular flange portion provided with a pawl-receiving opening, and an internal conical friction surface, a friction ring having an external conical surface nesting with the conical surface of said clutching member and having an inwardly directed lug, a pawl-carrying core driven by said drive shaft, a centrifugual pawl rotatably carried by said core and movable outwardly in response to centrifugal force upon rotation of said core to engage said opening of said second clutching member, a lateral projection on said pawl engageable with said lug, and a one-way clutch between said hub and said first clutching member.

16. In a variable speed power transmission coaxial drive and driven shafts, a hub member rotatable with said driven shaft, an axially movable clutch sleeve non-rotatably carried by said hub member, a first toothed clutching member rotatably journalled on said driven shaft, means drivingly connecting said first toothed member to said drive shaft, a second toothed clutching member rotatably supported by said driven shaft and having an annular flange portion provided with a pawl-receiving opening, and an internal conical friction surface, a friction ring having an external conical surface nesting with the conical surface of said clutching member and having an inwardly directed lug, a pawl-carrying core driven by said drive shaft, a centrifugal pawl rotatably carried by said core and movable outwardly in response to centrifugal force upon rotation of said core to engage said opening of said second clutching member, a lateral projection on said pawl engageable with said lug, and a one-way clutch between said hub and first clutching member.

17. In a variable speed power transmission coaxial drive and driven shafts, a hub member rotatable with said driven shaft, an axially movable clutch sleeve non-rotatably carried by said hub member, a first toothed clutching member drivingly connected to said drive shaft and rotatably journalled on said driven shaft, a second toothed clutching member journalled on said hub member and having an annular flange portion provided with a pawl-receiving opening, and an internal conical friction surface, a friction ring having an external conical surface nesting with the conical surface of said clutching member and having an inwardly directed lug, a pawl-carrying core driven by said drive shaft, a centrifugal pawl rotatably carried by said core and movable outwardly in response to centrifugal force upon rotation of said core to engage said opening of said second clutching member, a lateral projection on said pawl engageable with said lug, and a one-way roller clutch comprising an internal roller cam-faced raceway on said hub member, an external smooth-faced roller raceway on said first clutching member, and an intermediate roller carrier having a lug engageable with said sleeve for controlling said roller clutch.

18. In a power transmission, a drive shaft, a driven shaft, a pair of pawls carried by said drive shaft on opposite sides of its axis of rotation and movable outwardly opposite to each other under centrifugal action in response to predetermined speed of rotation of said drive shaft, a pawl engaging shell adapted for drive connection with said driven shaft, a plurality of substantially uniformly spaced pawl-receiving windows on said shell, and control means for governing the outward movement of said pawls, said control means including pawl stop means having circumferentially spaced stops between which each pawl is circumferentially operable and which circumferential stops are spaced apart at an angular distance greater than between adjacent windows to facilitate engagement between the pawl and shell within a relative movement between the pawl and shell no greater than the spacing between two adjacent windows following synchronous rotation prevailing between said pawl and shell, and said stops being at a radial distance in relation to the shell whereby the pawl may be engaged with said stops during a synchronous rotation of the pawl and shell.

19. Transmission mechanism comprising drive and driven shafts; means for drivingly connecting said shafts including a pair of relatively rotatable structures at least one of which is adapted for rotational change from one direction to the opposite direction relative to any point on the other of said structures; one of said structures carrying a pawl adapted to be projected from a disengaged position into an engaged position; a projection on said pawl; the other of said structures having a shell with a plurality of slots, one of which is adapted to be engaged by said pawl when the same is projected into engaging position whereby to lock said structures against relative rotation; a ring interposed between said structures, said ring having substantially diametrically opposite stepped lugs, one of which is engageable by said pawl projection for driving said ring when the pawl is rotating faster than said shell; a step on each of the opposite sides of each lug for engaging said pawl projections to prevent projection of the pawl into engaging position when the relative rotative speeds of said structures is asynchronous, and a recess of greater angular extent than that between adjacent shell slots extending circumferentially between one of said steps on one lug and the step on the said opposite lug circumferentially nearest to said one step for receiving the pawl projection when the pawl is projected into engaging position in response to a relative directional change of rotation of said structures to permit said pawl to enter a slot in said shell.

20. Transmission mechanism as claimed in claim 19 wherein the said ring is split through one of said stepped lugs.

21. In a variable speed power transmission for a vehicle having an engine and ignition system, gear means, manually operable clutch means shiftable from a neutral position to selectively establish either a one-way or a two-way relatively slow speed ratio drive arrangement, a centrifugally operable pawl clutch engageable to establish a relatively fast speed ratio drive arrangement when said manual clutch means is established in said one-way slow speed arrangement, said pawl clutch comprising a pawl carrier having centrifugally responsive pawls, and a freely rotatable pawl-receiving member adapted to be clutched by said manually shiftable clutch means in its said one-way drive position, blocker-synchronizing means between said shiftable clutch means and said pawl-receiving member, synchronizing means between said pawl carrier and pawl-receiving member, a switch operable by said manual clutch means when shifted to said one-way drive position, a speed responsive governor, and switch means under control of said governor and cooperable therewith for interrupting the engine ignition at a predetermined vehicle speed at or below which the said centrifugal pawl clutch is disengageable, for facilitating disengagement of said centrifugal pawl clutch.

22. In a variable speed power transmission as claimed in claim 5 wherein the said friction driving means between the pawl carrier and pawl receiving member comprises a split ring supported by said pawl receiving member.

23. In a power transmission, a drive shaft, a driven shaft, a pawl-carrying member drivingly connected to said drive shaft, a shell member having a pawl-receiving aperture, means journalling said shell member for freely rotatable movement relative to said driven shaft and facilitating a small amount of axial movement by said shell member relative to said driven shaft, a centrifugal pawl on said carrying member for drivingly connecting said shell member and drive shaft, means including an overrunning clutch for establishing a one-way driving connection between said drive and driven shafts around said shell member, jaw clutch means movable into engagement with said shell member for drivingly connecting said shell member and driven shaft and for establishing said one-way drive connection and movable out of said engagement for disconnecting these drive connections, means including a pair of rings carried by said shell member and energizable into frictional drive therewith in response to said engaging movement of said jaw clutch means for facilitating establishment of said drive connections and means on said pawl engageable with one of said rings for drivingly associating said pawl and this one ring, whereby said one ring also controls engagement of said pawl.

24. In a power transmission, a drive shaft, a driven shaft, a centrifugal pawl means driven by said drive shaft, a shell member freely rotatable relative to said driven member and interengageable with said pawl means for drivingly connecting said shell member and drive shaft, means including an overrunning clutch for establishing a one-way driving connection between said drive and driven shafts around said shell member, means including a ring carried by said shell member and in constant frictional drive engagement therewith for controlling engagement of said pawl means and shell member, and clutch means movable relative to said shell member for selectively drivingly connecting and disconnecting said shell member and driven shaft and said one-way driving connection, said clutch means during said connecting movement energizing said frictional drive engagement of said ring through said shell member whereby said ring may effect synchronization of the relative speeds of said drive and driven shafts and thereby facilitate completion of said drive connections by said clutch means.

25. In a power transmission, a drive shaft, a driven shaft, a centrifugal pawl driven by said drive shaft, a shell member freely rotatable relative to said driven member and interengageable with said pawl for drivingly connecting said shell member and drive shaft, means including an overrunning clutch for establishing a one-way driving connection between said drive and driven shafts around said shell member, means including a ring for controlling engagement of said pawl with said shell member and for synchronizing the relative speeds of said drive shaft and shell, means for energizing said synchronizing means, and jaw clutch means movable relative to said shell member for selectively drivingly connecting and disconnecting said shell member and driven shaft when establishing and disestablishing said one-way drive connection, said jaw clutch means being operable to actuate said energizing means in response to said drive connecting movement of said clutch means.

26. In a power transmission, a drive shaft, a driven shaft, a pawl carrier drivingly connected to said drive shaft, a centrifugally responsive pawl on said carrier, a shell coaxial with said drive shaft and having a pawl-receiving opening therein, said shell being freely rotatable relative to said driven shaft and said carrier and shell having limited relative axial movement, means providing a drive connection between said drive and driven shafts bypassing said shell, a friction ring having an external conical surface engaged with a complementary internal conical surface on said shell, means providing a driving connection between said pawl and ring, a manually shiftable clutch sleeve, shiftable relative to said shell for drivingly connecting said shell with said driven shaft and for simultaneously establishing said bypassing drive connection, and means responsive to connecting shift of said sleeve for energizing frictional drive between said ring and shell whereby said ring may facilitate completion of said bypassing drive connection.

ROY T. BUCY.
AUGUSTIN J. SYROVY.
WILLIAM T. DUNN.

References Cited in the file of this patent

UNITED STATES PATENTS

| Number | Name | Date |
|---|---|---|
| 2,170,926 | Keller | Aug. 29, 1939 |
| 2,194,787 | Dunn | Mar. 26, 1940 |
| 2,210,668 | Hopkins | Aug. 6, 1940 |
| 2,259,729 | Burtnett | Oct. 21, 1941 |
| 2,278,623 | Orr | Apr. 7, 1942 |
| 2,309,864 | Patterson | Feb. 2, 1943 |
| 2,343,312 | Maurer | Mar. 7, 1944 |
| 2,359,982 | Flinn | Oct. 10, 1944 |
| 2,380,559 | Tyken | July 31, 1945 |
| 2,383,149 | Neracher | Aug. 21, 1945 |
| 2,438,381 | Banker | Mar. 23, 1948 |
| 2,448,539 | Maurer | Sept. 7, 1948 |
| 2,504,173 | Barber | Apr. 18, 1950 |